Oct. 4, 1927.
H. L. STRONGSON
1,644,310
CABLE CONNECTER
Original Filed Dec. 4, 1922
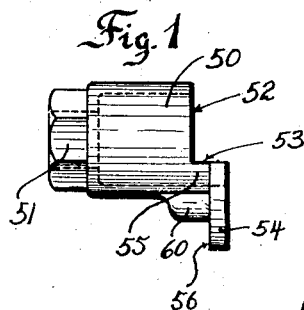
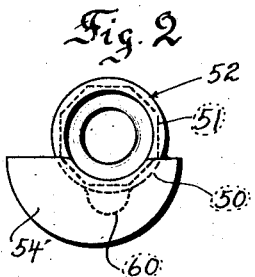
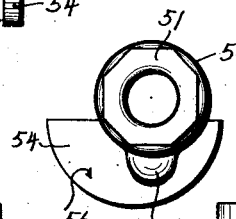
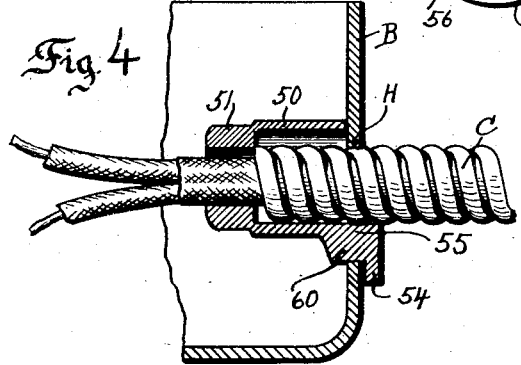
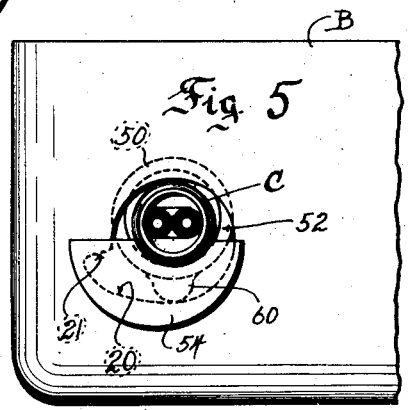
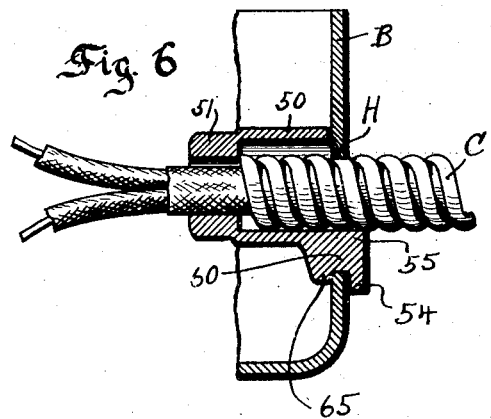
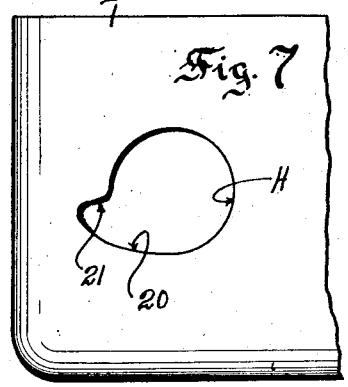
INVENTOR
Herman L. Strongson
BY
Bohleber & Ledbetter
ATTORNEYS Patented Oct. 4, 1927.

1,644,310

UNITED STATES PATENT OFFICE.

HERMAN L. STRONGSON, OF NEW YORK, N. Y., ASSIGNOR TO THE THOMAS & BETTS CO., OF ELIZABETH, NEW JERSEY, A CORPORATION OF NEW JERSEY.

CABLE CONNECTER.

Original application filed December 4, 1922, Serial No. 604,677. Divided and this application filed July 23, 1926. Serial No. 124,333.

This invention relates to cable connecters for connecting cable to electric fixture boxes and the like, and this application is a division of my former application Serial Number 604,677 filed December 4, 1922, now Patent 1,594,220.

An object of the invention is to produce an improved cable and box connecting means, and particularly a new type of cable connecter embodying a single pressure producing or operating means which simultaneously performs several functions, namely, that of gripping the cable directly against a box hole edge, and that of simultaneously anchoring the connecter in the box hole; and the foregoing features are combined with a connecter member so formed as to not only expose a part of the box hole edge directly to the cable but include as well an overreaching anchorage means which reaches through a box hole and over the edge thereof to rigidly anchor the connecter in the box hole.

It is a particular object of this invention to improve a sleeve connecter as to its end formation by which the combined exposed box hole edge and single pressure producing or operating means may be brought into use in an effective and simple way thereby attaining a new mode of operation in anchoring the connecter and a cable to a box.

Another object, or in fact to accomplish the foregoing, is to produce a connecter, say of sleeve form, which has a mutilated or cut away end so designed and shaped that one portion of the connecter is relatively short and another portion is somewhat longer, the shorter portion being preferably a full cylindrical or substantially a full cylindrical sleeve, while the longer portion is a projecting member not necessarily of sleeve form. The projecting member performs several functions, namely, that of coacting with the box to impart relative lateral or a sidewise motion to the connecter in the box hole to grip a cable, and that of reaching beyond and over the box hole edge in an abutting manner to position the box wall between or against anchorage means.

The accompanying drawings illustrate an example of the invention and changes in structure may be resorted to without departing from the underlying novel principles involved. For example, the operating or pressure producing means, which I describe herein, may be altered in various respects as conveniences and requirements of the trade may demand.

In the drawings Figures 1 and 2 are set forth as an example of the invention and are taken from Figure 15 of the parent patent application above referred to, Figure 1 showing a side elevation of the connecter and Figure 2 showing an outer end view thereof.

Figure 3 shows the inside or inner end elevation of the connecter.

Figures 4 and 5 illustrate an assembly view of the connecter, cable and box; the first being a longitudinal section and the latter being an outside end elevation.

Figure 6 illustrates an improvement over the former views and is an assembly of the improved connecter together with a cable and box, the improvement being an additional abutment means or ear to aid in anchoring the connecter in the box hole.

Figure 7 illustrates a fragmentary elevation of an electric fixture box showing one form of cable and connecter receiving box hole which may be used with the connecter.

Electric fixture boxes B have cable and connecter receiving holes H to receive cable C and my improved cable and box connecting means is designed to grip and fasten the cable in and against the box hole and simultaneously anchor itself therein by operation of a single pressure producing means.

Referring now more particularly to the drawings for a detailed description of an example of the invention, there is shown a connecter sleeve 50 which may be provided with or carry suitable means by which the connecter is forcibly moved relatively to and within the box hole H to attain the cable gripping function. To this end a tool receiving means is employed to bring into play the single pressure producing means, i. e. by which the connecter sleeve 50 may be moved or given a turn relatively to and within the box hole to grip the cable C in the box hole H and simultaneously anchor itself therein as well. The present example of tool receiving means comprises a nut 51 formed integral on the connecter, although it may assume other forms so long as there results a wedging or camming action by which, ultimately, the connecter is made to shift itself laterally or radially in a box hole to grip a cable.

The connecter may have a portion, as the sleeve 50, made or formed suitable in size to fit in or through the box hole H and is so formed as to expose a portion of the box hole edge directly to the cable C received thereinto. Furthermore, the connecter 50 is so shaped and formed on its end in a novel way as to expose a portion of the box hole edge and to cover up or conceal a portion thereof. The concealed portion of the box hole edge establishes anchorage with the connecter to hold it in the box and also the concealed box hole edge portion may afford means against which the connecter moves or travels to execute ultimate lateral motion of the connecter in the box hole to grip a cable against the exposed box hole edge.

In accordance with the foregoing general plans of the invention, the sleeve 50 has on one end thereof a two-stage or stepped end formation, i. e. a mutilated end, defined by a plane 52 extending at an angle to the axis of the sleeve 50 and intersecting a plane 53 which may extend substantially parallel to the sleeve axis. In this way the two intersecting sleeve end defining planes 52 and 53 cut away and form the sleeve connecter in such a way that it cooperates in a new and useful manner with the box hole H to permit the use of a single pressure producing means to perform several functions in combination with an exposed box hole edge.

The sleeve end 52 is designed to be placed parallel to the box wall B on one side thereof while a reach portion 55, defined by the plane 53, is intended to pass, project, or reach through the box hole H and carry an integral abutment 54 designed to reach over the box hole edge and rest on the other side of the box wall B. In this way the box wall is disposed between the sleeve end 52 and overreaching abutment means 54. The sleeve end 52 and hole edge overreaching portion 54 are suitably spaced to allow the box wall to rest therebetween and to permit full relative motion to occur between the connecter and box as will be described.

In other words, the sleeve end 52 and the overreaching means 54 are intended to anchor the connecter in the box hole against displacement. They are nevertheless spaced apart a sufficient distance to permit full motion of the connecter in the box hole, and the structure illustrated is by way of example to demonstrate the principle involved. It is noted that the overreaching portion 54 points away from the sleeve and over or alongside the box hole edge.

The sleeve defining planes 52 and 53 simply outlines a sleeve 50 with what I may term a reaching anchorage abutment means 54—55 included as a part of the sleeve because this portion 54—55 reaches through a box hole and over the edge thereof on the other side or hooks on the other side against the box wall surface in an abutting manner serving to anchor the connecter in a box hole because the box wall is between the sleeve end 52 and box hole edge overreaching portion 54.

The box wall abutment flange 54 may stand parallel to the plane 52 defining the end of sleeve portion 50 and the surface 56 of the abutment 54 may be spaced from the sleeve end surface or plane 52 a distance about equal to the thickness of the box wall B, so that the box wall rests between the surface 52 and surfaces 56 which disposes the axis of the sleeve at right-angles to the box wall B.

What is of major importance is that the projecting portion 55 includes a sleeve moving means 60 which reacts against the box, or as here shown it reacts against the hole edge to move the connecter relatively of the box wall in the box hole H to grip the cable against the exposed box hole edge. To this end a cam-follower 60 moves and reacts against the box hole edge H to impart motion to the connecter in the box hole. In the present example of the invention, this motion is primarily lateral or radial in that the sleeve 50 must move in a direction at right angles to the cable axis so to force the cable against the exposed box hole edge and simultaneously seat with great pressure the concealed portion of the box hole edge against and between the box hole overreaching portion 54—55.

In the example of the invention shown, and as illustrative of a single pressure producing means for the cable and box connecting means, there is shown the box B provided with the cam-shaped hole consisting of the usual circular edge H joining a tangent cam edge 20 which terminates in a stop edge 21. The stop edge 21 of the box hole H acts to prevent rotation of the sleeve 50 in the wrong direction and compels the mechanic making the installation to rotate the sleeve counter-clockwise as viewed from Figure 5.

The sleeve 50 is inserted in the box hole H and loosely retained in position by placing the cam means 60—20 in proper relation, i. e. the follower 60 is placed near the stop 21 and in this way the connecter sleeve is loose in the box hole whereupon the cable C is passed through the box hole and into the connecter sleeve 50 with the wire ends passed through the sleeve so that the wires may be manipulated and connections made in the box B. Having thus assembled the connecter and cable in the box hole, the action of the single pressure producing or operating means is now brought about which simultaneously anchors the connecter in the box hole and grips the cable therein as well because the connecter is subjected to suitable sidewise movement in the box hole. The sidewise or lateral motion is essential and is brought about in any suitable way regardless of whether the inclined edge or cam 21 is a part of the box or connecter, and regardless of whether the sleeve connecter is rotated in the box hole or otherwise shifted or moved to attain lateral gripping motion.

By application of a wrench to the nut 51 to rotate the connecter, the cam-follower 60 follows along the tangent cam edge or incline 20 and gradually forces the sleeve 50 laterally in the box hole thereby displacing the sleeve sidewise and away from the center of the box hole which means that the sleeve shifts outwardly from the box hole axis, the result of which is to forcibly bring the exposed box hole edge H eccentrically within the sleeve end 52. Therefore, the exposed portion of the box hole edge H creeps into the sleeve and impinges against the cable C thereby positively and with considerable pressure bearing the cable against the inner sleeve wall and gripping it against the inner eccentric portion of the box hole edge H.

It is apparent therefore that the connecter is subjected to a compound motion in the box hole, rotary and lateral, and that it is the rotary motion (itself of less importance) which initially imparts lateral or radial motion to the connecter and slides it sidewise in the box hole to perform the cable gripping function. The lateral motion is therefore essential and may be brought about in any suitable way.

Furthermore, the gripping action which occurs pursuant to the rotation of the sleeve, also generates considerable pressure between the cam-follower 60 and the box hole edge H, the result of which is to steady the connecter against wobbling motion in the box wall. The cam-follower 60 establishes a firm seated contact between the connecter and box hole edge H on one side of the cable C while the exposed box hole edge on the other side embeds itself into the cable and prevents relative motion between the cable and the box and between the connecter and the box.

One portion of the connecter if desired may be made too large to fit through the box hole. For example, the abutment 54 may be so large as to prevent it from passing through the box hole and thus, if the connecter is manufactured in that way, its sleeve portion 50 is usually introduced through the box hole and the surface 56 is brought to rest adjacent one side of the box wall while the sleeve end surface 52 is placed on the other side of the box. In this way, one portion of the connecter may be introduced throuh the box hole but does not pass all the way through and acts as a stop against one side of the box.

While I have explained that the sleeve 50 may be made small size to fit through the box hole and the other part 54 may be too large for this purpose, this relationship may better be reversed for certain wiring jobs. Furthermore, the large size abutment 54 spreads across and covers the box hole H to form a well closed box.

Referring to the improvement shown in Figure 6, an abutment ear 65 is included integrally on the sleeve extension 55, and more particularly on the cam follower 60. The ear 65 is spaced from the abutment 54 a distance about equal to the thickness of the box wall B so as to place the wall of a box between the two portions. Thus the two abutments 65 and 54 act together to prevent longitudinal displacement of the connecter from the box hole. It is to be appreciated that the two abutments are spaced sufficiently far apart as to not interfere with relative movement between the box and connecter.

The connecter end 50 readily passes through the box hole H and is then tilted so that the ear 65 is maneuvered into position on the other side of the box wall opposite from that to which the connecter was inserted and in this way the box hole edge overreaching abutment means, comprising abutments 54 and 65 and comprising the reach portion 55, hook over or overreach the box hole edge H to anchor the connecter in the box wall against longitudinal displacement.

The connecter is novel in respect to the peculiar mutilated sleeve end formation by which the box hole edge is in part exposed in combination with overreaching anchorage means to hold the connecter in the said exposed box hole edge without screws being placed through the box wall. One way of accomplishing this is the two-stage sleeve length, which characterizes this invention, whereby the sleeve is made with at least two lengths, a short one and a long one, the latter including the overreaching abutment which rests on that side of the box wall which is opposite the shorter one.

This type of cable connecter does not require screw connecting means by which the connecter is screw-fastened to the box wall, and the single pressure producing or operating means is uniquely organized as an important part of the cable box and connecting means so that the action of one operating means performs the several novel functions necessary to anchor both the connecter and the cable in and against the sharp bare exposed edge of a box hole.

The tool receiving means 51 is or may be designed to fit inside the box and thus the connecter is well adapted to old house work but may be used for new house work if desired. The rotatable tool receiving means 51 is shown as a nut but the principle of the invention admits of use of other means. The nut 51 is engaged by a tool to effect rotation of the connecter within the box hole the same as attained by screw means, i. e. the nut 51 causes the sleeve moving or operating means 20—60 to function because relative rotary motion impressed between these two elements 20 and 60 imparts side wise movement to the sleeve within the box hole, and this relative motion may be initiated by application of a tool to the nut 51 inside the box.

I have produced in this invention a connecter having a cut-away end which exposes a portion of the box hole edge to a cable and a single operating means which acts to move the connecter side wise in the box hole, and these several considerations are true without employing a screw fastening of any character between the box and connecter. The cam 20 and follower 60 are tantamount to screw operating means which imparts lateral motion to the connecter in the box hole to grip a cable between the exposed box hole edge and connecter and this tool receiving means 51 or its equivalent may preferably be placed inside the box.

What I claim is:

1. Cable and box connecting means comprising, a box having a cable and connecter receiving hole, a member having a mutilated end and suitable in size to fit into the box hole and having a portion of said end formed substantially parallel to one side of the box wall, the other portion of said end extended at an angle to said box wall and reaching through the box hole which leaves exposed a part of the box hole edge, including an anchorage portion which reaches beyond the box hole edge to the other side of the box wall, and operating means, included in the cable and box connecting means, to grip the cable between the box hole edge and member and to positively seat against the box hole edge that connecter portion which reaches through said box hole.

2. Cable and box connecting means as defined in claim 1 wherein the operating means moves the member in two directions in the box hole, one of which directions is laterally or sidewise to grip the cable against the exposed box hole edge.

3. Cable and box connecting means comprising, a box having a connector and cable receiving hole, a sleeve on one side of the box wall and including a mutilated end formed by planes intersecting at right angles which produces a short sleeve including a reaching portion small enough to fit into and through the box hole, the said mutilated end concealing a part and exposing the remainder of the box hole edge to the cable, means included on the reaching portion which overreaches the hole edge on the other side of the box wall, and operating means, including sleeve moving means on the reaching portion, to move the reaching portion against the box hole edge and force the sleeve laterally in the box hole to grip the cable against the exposed box hole edge.

4. Cable and box connecting means as defined in claim 3 wherein the operating means imparts movement to the reaching portion, and the engagement of the sleeve moving means on the reaching portion against the box hole edge imparts lateral relative motion to the sleeve to grip the cable against the box hole edge.

5. Cable and box connecting means comprising, a box having a cable and connecter receiving hole, a sleeve including a portion suitable in size to fit into the box hole, one end of the sleeve formed in part substantially parallel to one side of the box wall, the other portion of the same end of the sleeve formed substantially at right angles to said box wall and projecting through the box hole which leaves exposed a part of the box hole edge, including an anchorage portion which reaches over the box hole edge on the other side of the box wall, and operating means, included in the cable and box connecting means, to grip the cable between the exposed box hole edge and said projecting portion of the member and to positively seat the projecting portion against the box hole edge.

6. Cable and box connecting means as defined in claim 5 wherein the operating means moves the sleeve and portion projecting therefrom laterally relative in the box hole to grip the cable between said projecting portion and the box hole edge.

7. Cable and box connecting means comprising, a box having a cable and connecter receiving hole, a sleeve connecter having a mutilated end and including a portion suitable in size to fit into the box hole, a portion of said end of the sleeve formed substantially parallel to one side of the box wall, the other portion of said mutilated end formed substantially at right angles to said box wall and reaching through the box hole which leaves exposed a part of the box hole edge, including an anchorage portion which reaches over the box hole edge and on the other side of the box wall, and operating means, included in the cable and box connecting means, to subject the connecter to a compound motion in the box hole and resulting in relative lateral motion thereof to grip the cable between the box hole edge and connecter.

8. Cable and box connecting means comprising, a box having a cable and connecter receiving hole, a member having a mutilated end and suitable in size to fit into the box hole and having a portion of said end formed parallel to and abutting one side of the box wall, the other portion of said end formed at an angle to the box wall and projecting through the box hole which exposes the box hole edge and including a portion abutting the other side of the box wall to anchor the member against displacement, and operating means, included in the cable and box connecting means, to grip the cable between the box hole edge and said projecting portion of the member.

9. Cable and box connecting means comprising, a box having a cable and connecter receiving hole, a member having a mutilated end including a portion suitable in size to fit into the box hole and having a portion of said end formed parallel to and abutting one side of the box wall, the other portion of said end formed substantially at right angles to the box wall and projecting through the box hole and including a portion abutting the other side of the box wall to anchor the member against displacement, and operating means, included in the cable and box connecting means, to impart double motion to the member, one of which is lateral with respect to the box hole axis to grip the cable between the box hole edge and member.

10. Cable and box connecting means comprising, a box having a cable and connecter receiving hole, a sleeve placed inside the box and having a mutilated end including a reduced size portion which reaches through the box and which includes anchorage means on the end thereof reaching over the box hole edge, said reduced portion formed to expose the box hole edge to the cable, and operating means, included in the cable and box connecting means, to grip the cable between the exposed box hole edge and sleeve.

11. Cable and box connecting means comprising, a box having a cable and connecter receiving hole, a sleeve placed in the box and having a mutilated end which includes a reduced size portion which reaches through the box hole and which includes overreaching anchorage means on the outer end thereof on the outside of the box and which reaches around the box hole edge in a direction away from the sleeve, said mutilated end portion formed to expose the box hole edge to the cable, and operating means, included in the cable and box connecting means, to grip the cable between the exposed box hole edge and sleeve.

12. Cable and box connecting means as defined in claim 11 wherein the overreaching anchorage means on the outer end is made too large to pass through the box hole.

13. Cable and box connecting means comprising, a box provided with a cable and connecter receiving hole, a connecter mounted in the box hole and embodying a sleeve on one side of the box wall, said sleeve having a mutilated end including a member projecting therefrom which exposes the box hole edge and which reaches through the box hole to the other side of the box to support as aforesaid the sleeve on one side of the box wall, anchorage means included on said projecting member reaching over the box hole edge to that side of the box wall which is opposite the sleeve to rigidly fix the connecter in the box hole after the parts are assembled, and operating means, included in said cable and box connecting means, to move the connecter with respect to and in engagement with the box hole edge to grip the cable between said connecter and the exposed box hole edge.

14. Cable and box connecting means comprising, a box provided with a cable and connecter receiving hole, a connecter mounted in the box hole and embodying a sleeve on one side of the box wall, said connecter having a mutilated end including a member projecting from the sleeve, which exposes the box hole edge, and which reaches through the box hole to the other side of the box and against which said cable rests, a box hole edge bearing portion formed on said projecting member which slidably bears against said box hole edge, anchorage means included on said projecting member reaching over the box hole edge to that side of the box wall which is opposite the sleeve to rigidly fix the connecter in the box hole after the parts are assembled, and operating means, included in the cable and box connecting means, to move the connecter relative to the box to grip the cable between the exposed box hole edge and said projecting member.

15. Cable and box connecting means comprising, a box having a hole in its wall to receive a cable and connecter, a connecter mounted in the box hole and embodying a sleeve entirely inside the box with its end placed close to the box wall hole and which exposes the hole edge directly to the cable, said connecter having a mutilated end including an anchorage member projecting through the box hole and the cable resting against the projecting anchorage member, a hole edge bearing portion formed on said member which slides against the box hole edge and which includes means reaching over the edge of the hole to the outside of the box, and means operated from inside of the box, included in the cable and box connecting means, to grip the cable between the exposed box hole edge and anchorage member.

16. Cable and box connecting means as defined in claim 15 wherein the means operated from inside the box, slides the hole edge bearing portion relatively along said edge, to move the sleeve and anchorage member laterally relative in the box hole, to grip the cable between the exposed hole edge and said anchorage member.

17. A cable connecter comprising a sleeve having a mutilated cut away sleeve end defined by planes intersecting at right angles, thus producing a sleeve end surface at right angles to the sleeve axis, and a portion parallel thereto and projecting from the sleeve, means included on the projecting portion parallel to the sleeve axis to reach beyond a box hole edge to anchor the connecter in a box hole, and means also included on the projecting portion to movably engage a box hole edge by which to impart lateral motion to the connecter within a box hole.

18. A connecter comprising a sleeve having a mutilated cut away end, including a portion projecting from the sleeve end which exposes one portion of a box hole edge and rests on the other portion, and including two spaced abutments on the projecting portion between which a box hole edge is adapted to be received, and box hole edge engaging means formed on the connecter to bear against a cam shaped box hole to move the connecter laterally in said box hole to grip a cable against said exposed box hole edge.

In testimony whereof I affix my signature.

HERMAN L. STRONGSON.